United States Patent [19]

Neal

[11] 4,018,258
[45] Apr. 19, 1977

[54] ANTI-SKID DEVICE FOR VEHICLE WHEEL

[76] Inventor: Vay F. Neal, 225 S. Main St., Punxsutawney, Pa. 15767

[22] Filed: July 29, 1975

[21] Appl. No.: 600,050

[52] U.S. Cl. .............................. 152/208; 152/226
[51] Int. Cl.² ........................................ B60C 27/20
[58] Field of Search .................... 152/167–169, 152/208, 210–212, 225 R, 226–230

[56] References Cited
UNITED STATES PATENTS

| | | | |
|---|---|---|---|
| 2,708,470 | 5/1955 | Gramelspacher | 152/208 |
| 3,120,255 | 2/1964 | Coppola | 152/208 |
| 3,147,790 | 9/1964 | Viscardi | 152/208 |
| 3,911,984 | 10/1975 | West | 152/208 |

*Primary Examiner*—Drayton E. Hoffman
*Attorney, Agent, or Firm*—Ralph L. Thomas

[57] ABSTRACT

An anti-skid device for a vehicle tire includes a plurality of individual anti-skid units mounted on the outer surface of each tire. Each of the anti-skid units includes a resilient member having an anti-skid surface mounted in a recessed portion of the tire. Each anti-skid unit further includes an adjusting mechanism mounted in the tire and coupled to the resilient member for adjusting the position of the resilient member to vary the anti-skid surface from a retracted position within the recessed portion of the tire to an extended position with the anti-skid surface beyond the outer surface of the tire.

8 Claims, 6 Drawing Figures

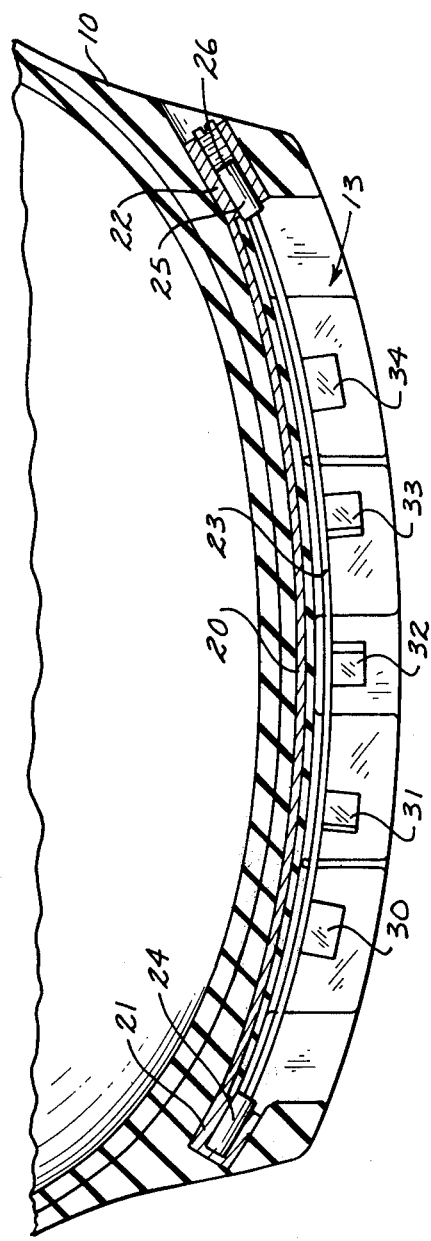
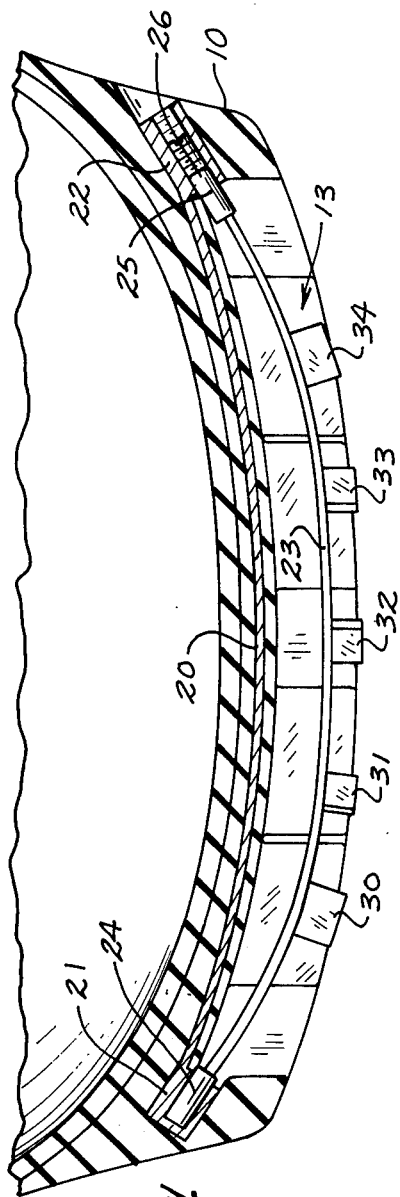
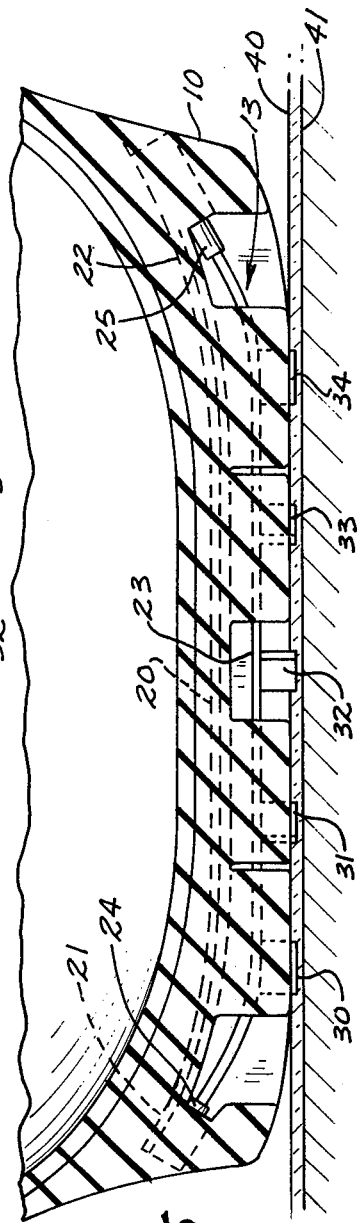

ANTI-SKID DEVICE FOR VEHICLE WHEEL

BACKGROUND OF THE INVENTION

1. Field of the Invention

This invention relates to anti-skid devices for wheel vehicles in general, and more particularly to such devices for use on automobiles, trucks, and the like.

2. Description of the Prior Art

Many types of anti-skid devices in use today have various disadvantages. Snow chains present an unpleasant task to mount them on wheels and subsequently remove them. Moreover, vehicles must proceed relatively slowly when snow chains are used. There is the further disadvantage that when they break snow chains may damage the vehicle. Lastly, there is the undesirable feature that snow chains must be removed when not driving on snow or ice-covered roadways.

The use of spikes in tires serve as an effective anti-skid arrangement. However, the disadvantages are noisiness, excessive damage to the road surfaces, and the inherent limitations their use imposes on maximum speed.

It is desirable to provide an anti-skid device mounted on the tire which readily may be activated when snow or ice-covered roadways are encountered and deactivated when roadways are free of snow and ice. It is to this end that the present invention is directed.

SUMMARY OF THE INVENTION

It is a feature of this invention to provide an improved anti-skid device which permanently may be mounted on a tire and activated or deactivated, readily and easily, as road conditions dictate.

It is another feature of this invention to provide an improved anti-skid device permanently mounted on the tire of a vehicle with a portion of the anti-skid device embedded in the tire and the remaining portion of the anti-skid device disposed in a recess or slot in the tire, such latter portion being activated to extend beyond the recess in the tire to engage snow or ice-covered surface of the roadway.

In a preferred embodiment according to this invention an anti-skid device for vehicle wheels equipped with tires is provided. It comprises a plurality of individual anti-skid units mounted on each tire, each of said anti-skid units including: a base member, a sleeve mounted on one end of the base member, a threaded collar mounted on the other end of said base member; a resilient member in the form of a leaf spring having an anti-skid surface, said anti-skid surface being formed of cleets mounted on one surface of the leaf spring; said base member being mounted on the tire with the sleeve and collar embedded in the tire, and the tire being recessed between the collar and the sleeve, one end of the leaf spring being mounted in said sleeve, screw adjusting means disposed in the threaded portion of said collar, the other end of said leaf spring being attached to said screw adjusting means whereby the leaf spring may be adjusted to vary the position of the cleets from a retracted position within the recessed portion of the tire to a position with the cleets extending beyond the outer surface of the tire.

The foregoing and other objects, features, and advantages of the invention will be apparent from the following more particular description of preferred embodiments of the invention, as illustrated in the accompanied drawings.

BRIEF DESCRIPTION OF THE DRAWINGS

FIG. 3 is a cross-sectional view taken on the line 3—3 in FIG. 1 showing the cleets in the retracted position.

FIG. 4 is a cross-sectional view identical to FIG. 3 except the cleets are shown in the extended position projecting beyond the outer surface of the tire.

FIG. 5 is a cross-sectional view taken on the line 5—5 in FIG. 5 which shows the cleets engaging an ice surface.

DESCRIPTION OF THE PREFERRED EMBODIMENTS

Figure 1:
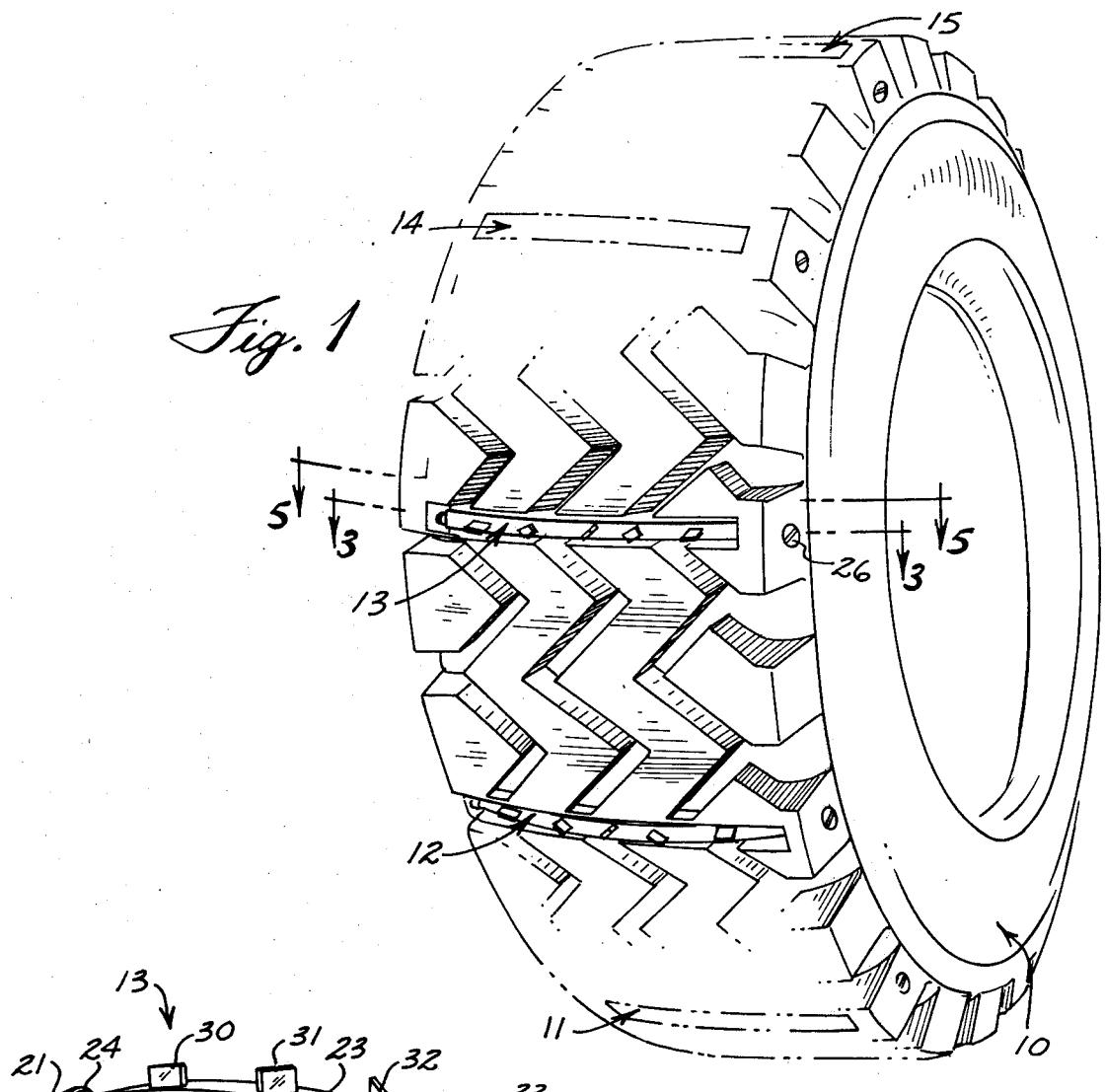
FIG. 1 is a perspective view of a tire equipped with an anti-skid device according to this invention.

Reference is made to FIG. 1 which shows an anti-skid device composed of a plurality of individual anti-skid units disposed around the periphery of a vehicle tire 10. Anti-skid units 11 through 15 are shown on the front face of the tire 10, and other such anti-skid units, not seen in this view, are disposed on the back surface of the tire 10. Each of the anti-skid units is identical in construction.

Figure 2:
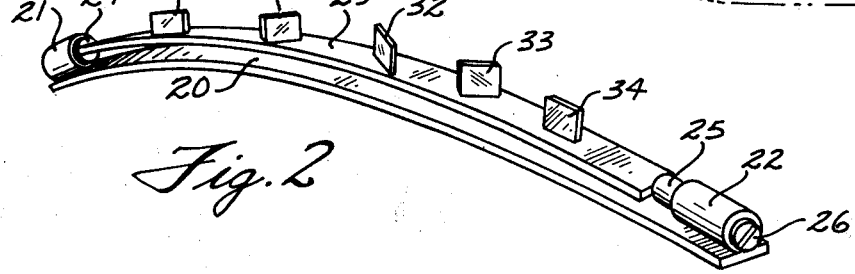
FIG. 2 is an expanded view of the anti-skid device 13 in FIG. 1.

Referring next to FIG. 2, an expanded view of the anti-skid unit 13 in FIG. 1 is shown. A base member or strip 20 extends across the tire 10. A sleeve 21 and a collar 22 are formed as an integral part of the base member or strip 20. A resilient member 23 has cylindrical end members 24 and 25 attached thereto. The cylindrical end members 24 and 25 are mounted within the sleeve 21 and the collar 22, respectively. A screw 26 is disposed within a threaded portion of the collar 22, and the screw 26 is adjusted to change the position of the cylindrical end member 25 and vary the curvature of the outer surface of the resilient member 23. The resilient member 23 has an outer surface which is rough, abrasive, or of an anti-skid nature so that it will not slide on snow or ice. In FIG. 2 a plurality of cleets 30 through 34 provides an abrasive surface, but other arrangements might be equally suitable. The cleets 30 through 34 may be made of various types of material including metal, fiber, or glass, for instance. The resilient member 23 preferably is made of a metallic leaf spring. The base member 20 must be sturdy, and preferably it is made of metal although a sturdy plastic or fiber may be used.

Reference is made next to FIG. 3 which illustrates a cross-sectional view taken on the line 3—3 in FIG. 1. With the adjustable screw 26, disposed as shown in FIG. 3, the cleets 30 through 34 lie within the recessed portion of the tire 10, and they do not engage the roadway. FIG. 4 is a view identical to FIG. 3, but the screw 26 has been adjusted to flex the resilient member 23 so that the cleets 30 through 34 extend beyond the surface of the tire 10.

Referring next to FIG. 4, this is a cross-sectional view taken on the line 5—5 in FIG. 1. The tire 10 in FIG. 5 is shown resting on an ice surface over a road surface 41. When the anti-skid unit 13 rests on the ice surface 40, the cleets 30 through 34 project into the ice thereby to prevent a slip or skid of the tire 10. When the anti-skid unit 13 moves to any position other than beneath the tire 10, the resilient member 23 forces the cleets 30 through 34 outwardly to the position shown in FIG. 4.

Figure 6:
FIG. 6 illustrates a modified arrangement for securing an anti-skid device to a tire according to this invention.

Reference is made next to FIG. 6 which illustrates a modification of the anti-skid unit 13 in FIG. 2. In FIG. 6 the base member 20 has been eliminated. The collar 22 is embedded in the tire 10 in the same manner as shown in FIG. 3. However, a circular member 50, connected to and disposed around the outer surface of the collar 22, serves to anchor or hold the collar 22 in position. Additional members 50, not shown, may be provided to lend greater stability, if desired. A similar circular member, not shown, is disposed around the sleeve 21 and serves in like fashion to anchor or hold it in position.

While this invention has been particularly described with reference to preferred embodiments thereof, it will be understood by those skilled in the art that various changes in form and detail may be made therein without departing from the spirit and scope of the invention.

What is claimed is:

1. An anti-skid device for vehicle wheels equipped with tires, said anti-skid device comprising a plurality of individual anti-skid units mounted on each tire, each of said anti-skid units including:
   a sleeve mounted on the tire, a threaded collar mounted on the tire and displaced from the sleeve,
   a resilient member in the form of a leaf spring having an anti-skid surface, said anti-skid surface being formed of cleets mounted on one surface of the leaf spring,
   a recess formed in the tire between the threaded collar and the sleeve, the resilient member being disposed in the recess with one end mounted in said sleeve, and
   screw adjusting means disposed in the threaded portion of said collar, the other end of said resilient member being attached to said screw adjusting means, said screw adjusting means being operable selectively to load or unload the resilient member axially and move said resilient member between operative and inoperative positions.

2. An anti-skid device for vehicle wheels equipped with tires, said anti-skid device comprising a plurality of individual anti-skid units mounted on each tire, each of said anti-skid units including:
   a sleeve embedded in one position in the tire, a threaded collar embedded in a second position in the tire,
   a resilient member in the form of a leaf spring having an anti-skid surface, said anti-skid surface being formed of cleets mounted on one surface of the leaf spring,
   a recess formed in the tire between the collar and the sleeve, said leaf spring being disposed in the recess with one end of the leaf spring being mounted in said sleeve, and
   screw adjusting means disposed in the threaded portion of said collar, the other end of said leaf spring being attached to said screw adjusting means which screw adjusting means is operable to load axially the leaf spring and vary the position of the cleets from a retracted position within the recessed portion of the tire to a position with the cleets extending beyond the outer surface of the tire.

3. An anti-skid device for vehicle wheels equipped with tires, said anti-skid device comprising a plurality of individual anti-skid units mounted on each tire, each of said anti-skid units including:
   a base member, a sleeve mounted on one end of the base member, a threaded collar mounted on the other end of said base member,
   a resilient member in the form of a leaf spring having an anti-skid surface, said anti-skid surface being formed of cleets mounted on one surface of the leaf spring,
   said base member being mounted on the tire with the tire being recessed between the collar and the sleeve, one end of the leaf spring being mounted in said sleeve, and
   screw adjusting means disposed in the threaded portion of said collar, the other end of said leaf spring being attached to said screw adjusting means which screw adjusting means is operable to load the leaf spring axially and vary the position of the cleets from a retracted position within the recessed portion of the tire to a position with the cleets extending beyond the outer surface of the tire.

4. An anti-skid device for vehicle wheels equipped with tires, said anti-skid device comprising a plurality of individual anti-skid units mounted on each tire, each of said anti-skid units including:
   a base member, a sleeve mounted on one end of the base member, a threaded collar mounted on the other end of said base member,
   a resilient member in the form of a leaf spring having an anti-skid surface, said anti-skid surface being formed of cleets mounted on one surface of the leaf spring,
   said base member being mounted on the tire with the sleeve and collar embedded in the tire and the tire being recessed between the collar and the sleeve, one end of the leaf spring being mounted in said sleeve, and
   screw adjusting means disposed in the threaded portion of said collar, the other end of said leaf spring being attached to said screw adjusting means which screw adjusting means is operable to load the leaf spring axially and vary the position of the cleets from a retracted position within the recessed portion of the tire to a position with the cleets extending beyond the outer surface of the tire.

5. An anti-skid device for vehicle wheels equipped with tires, said anti-skid device comprising:
   a plurality of individual anti-skid units mounted on each tire,
   each of said units including a resilient member mounted in a recessed portion of the tire, said resilient member having an anti-skid surface, and
   an adjusting mechanism mounted on the tire and coupled to the resilient member for loading the resilient member axially to vary the anti-skid surface from a retracted position within the recessed portion of the tire to a position with the anti-skid surface extending beyond the outer surface of the tire.

6. An anti-skid device for vehicles equipped with tires, said anti-skid device comprising a plurality of individual anti-skid units mounted on each tire, each of said anti-skid units including:
   a resilient member having an anti-skid surface,
   mounting means attached to the tire, each tire having a recess portion adjacent said mounting means, said resilient member being mounted in the recess portion of the tire by said mounting means, and an adjusting mechanism coupled to the mounting means and the resilient member for loading the resilient member axially to vary the anti-skid surface from a retracted position within the recess portion of the tire to an extended position with the anti-skid surface projecting beyond the outer surface of the tire.

7. An anti-skid device for vehicle wheels equipped with tires, said anti-skid device comprising a plurality of individual anti-skid units mounted on each tire, each of said anti-skid units including:
   a resilient member having an anti-skid surface,
   a first mounting member mounted on the tire, a second mounting member mounted on the tire and displaced from the first mounting member,
   a recess formed in the tire between the first and second mounting members, said resilient member being disposed in the recess with one end of the resilient member coupled to the first mounting member, and
   adjusting means attached to the second mounting member, the other end of said resilient member being coupled to said adjusting means which is operable to load the resilient member axially and move the position of the anti-skid surface from a retracted position within the recess portion of the tire to a position with the anti-skid surface extending beyond the outer surface of the tire.

8. An anti-skid device for vehicle wheels equipped with tires, said anti-skid device comprising a plurality of individual anti-skid units mounted on each tire, each of said anti-skid units including:
   a resilient member having an anti-skid surface,
   a first mounting member embedded in the tire, a second mounting member embedded in the tire and displaced from the first mounting member,
   a recess formed in the tire between the first and second mounting members, said resilient member being disposed in the recess with one end of the resilient member coupled to the first mounting member, and
   adjusting means attached to the second mounting member, the other end of said resilient member being coupled to said adjusting means which is operable to load axially the resilient member and vary the position of the anti-skid surface from a retracted position within the recess portion of the tire to a position with the anti-skid surface extending beyond the outer surface of the tire.

* * * * *